May 1, 1962 E. J. ALM 3,031,719
INFLATABLE PRESSURE DEVICE
Filed July 20, 1959 2 Sheets-Sheet 1

Inventor
ERHARD J. ALM
by: [signature]
Attorney

May 1, 1962 E. J. ALM 3,031,719
INFLATABLE PRESSURE DEVICE
Filed July 20, 1959 2 Sheets-Sheet 2

Inventor
ERHARD J. ALM
by: *Attorney*

United States Patent Office 3,031,719
Patented May 1, 1962

3,031,719
INFLATABLE PRESSURE DEVICE
Erhard J. Alm, Toronto, Ontario, Canada, assignor to Vulcan Equipment Co. Ltd., Toronto, Ontario, Canada
Filed July 20, 1959, Ser. No. 828,103
8 Claims. (Cl. 18—18)

This invention relates to inflatable pressure members which are adapted to be used with vulcanizing and tire repair equipment.

A tire repair operation, as for example, in vulcanizing an area of rubber patch in a tire casing, requires the application of pressure over a range of temperatures and while there have beeen many devices provided to apply pressure under the application of heat, certain disadvantages are inherent in such devices.

Inflatable pressure devices such as section bags have in the past been formed of a vulcanized rubber having embedded therein cord material or fabric which extends throughout the entire wall of the pressure member. Also these devices have had relatively thick walls by reason of inclusion of cord material or fabric and to withstand deterioration which accompanies the application of heat.

Because of the thickness of the walls and also because of the incorporation therein of cords or fabric, such devices have extremely limited expansibility and cannot intimately conform to the wall surface of a tire casing.

Metal cores which are used within a tire casing usually have integral heating elements to provide the heat necessary in a vulcanizing operation but the metal core is a good conductor and dissipates heat to the atmosphere and to the tire casing walls around the area to be vulcanized. This arrangement may result in overcuring the unvulcanized rubber patch while excess heat deteriorates the tire casing wall.

In my copending application, Serial No. 646,016, a planar flexible inflatable pressure member for vulcanizing and tire repair operations and its method of use has been described. This application is a continuation-in-part of the aforementioned application and is directed towards improvements in such planar inflatable pressure members.

A principal object of this invention is to eliminate the problems experienced with known metal cores and inflatable cores and in particular, to provide a method of manufacture for an inflatable pressure member which will have the necessary degree of flexibility and conformability to achieve a precise application of pressure over an area of a tire casing wall to be repaired, and at the same time be able to withstand the range of temperature without deterioration over an extremely long period of time, as compared with those devices now available on the market.

More specifically, it is a particular object of this invention to provide a pressure member for application within or without a tire casing wall section and which will conform intimately to either the inner or outer wall section over a range of tire sizes and shapes.

Another important object of this invention is to provide an inflatable pressure member which may be readily associated with a heating device to limit the application of heat to a tire casing wall over a defined area, the inflatable pressure member being constructed so as to withstand the dissipated heat energy and thereby prolong its useful life.

Still another object of this invention is to provide an inflatable pressure member which can accommodate a range of tire sizes over given limits while it is very important to provide an inflatable pressure member which is economical to manufacture as compared with prior art devices.

According to the invention a pressure member is constituted by an outer envelope of substantially nonextensible but flexible material and being so formed as to restrict the ballooning of an inner captive substantially planar inflatable bag of vulcanized rubber over a major portion of its area but leaving a portion of its area unrestrained against ballooning.

More particularly, the principal feature of the improvement over the device shown in my copending application Serial No. 646,016 resides in adhering to one surface of a broad flat lying inflatable bag of preferably, expansible rubber, a layer of non-extensible fabric such as cotton duck or the like with the fabric lapped over the bounding edges of the bag and extending inwardly of the edges of the opposite surface to define a boundary therearound but leaving the central portion of the bag unrestricted for ballooning which portion under inflation has the attribute of conforming the opposed layered surface of the bag into intimate contact with a specified area of surface of a tire casing wall. The fabric also serves as an insulating pad and may comprise a number of layers.

It is also an important feature that a heat resistant material such as fibreglass in sheet form can be interleaved with the fabric layers in an area which is subjected to intense heat in a vulcanizing operation.

Another very important feature resides in providing a pressure member as aforesaid in which the captive inflatable, and expansible, member is provided with an outer vulcanized rubber casing or sheath completely surrounding same but physically separate, the outer casing or sheath, only, being restricted by the layered fabric against ballooning.

Another feature of this invention resides in orienting applied fabric in strips to control ballooning in but a single direction to provide an expanded member which will have the property of conformability where the application of pressure is to a concave surface as opposed to a convex surface as in the case with an interior wall area of a tire casing as opposed to an exterior wall area.

Still another important feature of this invention resides in the method of manufacture of inflatable pressure members as aforesaid wherein the inner inflatable pressure member is first formed from a length of unvulcanized rubber tubing sealed upon its end and provided with a valve device, such member being first vulcanized and then sleeved into a section of unvulcanized rubber tubing which is sealed upon its end and has applied thereto by a suitable cement or adhesive, substantially non-extensible layered fabric and insulation, the composite device then being subjected to vulcanizing temperatures and pressure within a mould to cure the unvulcanized rubber sheath or casing and adhesive, the pressure in the vulcanizing operation being supplied by inflating the inner member to urge the outer sheath into contact with the mould surfaces.

These and other objects and features will be found in the following specification to be read in conjunction with the sheet of drawings in which:

FIGURE 6 is a perspective view of another embodiment of the invention, partly broken away, for insertion within a tire casing; whereas FIGURE 7 is a perspective view of the device of FIGURES 4 and 5 in which the outer casing has been deformed into a U-shape.

Figure 1:
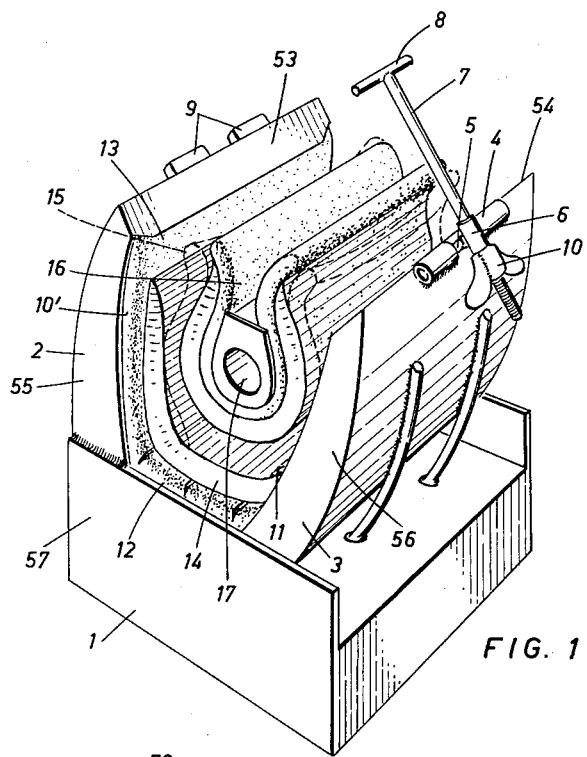
FIGURE 1 is a perspective view of a vulcanizing machine incorporating pressure members constructed in accordance with my invention.

To illustrate the application of the invention, reference is first made to FIGURE 1 wherein a vulcanizing apparatus is illustrated, comprising a base 1, a fixed recessed sidewall 2 and a pivoted recessed side wall 3 which is adapted to swing towards and away from fixed wall 2.

Swingable side wall 3 carries aligned knuckles 4 in which a pivot bar 5 is received, pivot bar 5 carrying a sleeve 6 in which a clamp screw 7 is slidably received. One end of screw 7 carries a depending lug 8 which is adapted to be inserted between and grip bosses 9 mounted on the fixed side wall 2 when clamp screw 7 is pivoted to extend across the top of the walls 2 and 3. A wing nut 10 threadably mounted on the screw 7 enables the pivoted side wall 3 to be drawn toward the fixed side wall 2 to clamp the members disposed therewithin against displacement.

Disposed within recess 10' and 11 of side walls 2 and 3, respectively, and extending across the bottom wall 12 is an expansible pressure member 13 constructed in accordance with this invention having a normally planar disposition which can be deformed into a U-shape, as shown and a suitable heater pad 14 is supported thereon in next adjacent relation, the heater pad comprising, for example, an asbestos base having resistance wires woven therein and covered by a suitable material of fabric which may be of asbestos, canvas or rubberized material capable of withstanding heat.

In the vulcanizing apparatus, the means for applying pressure to the interior of the tire casing, which is illustrated as a section 15 comprises as seen in FIGURE 1, an inflatable and expansible pressure member 16 constructed in accordance with the invention and having a normally planar disposition which is arranged around a tubular core 17 provided with face plates 18 at each end to define therewith a recessed part annular portion having a dimension to receive pressure member 16 in snug fit.

The fixed wall 2 of the vulcanizing apparatus is provided with an aperture to register with the valve device for pressure member 13 and similarly, the annular wall of core 17 can be apertured to receive the valve device for pressure member 16.

Figure 2:
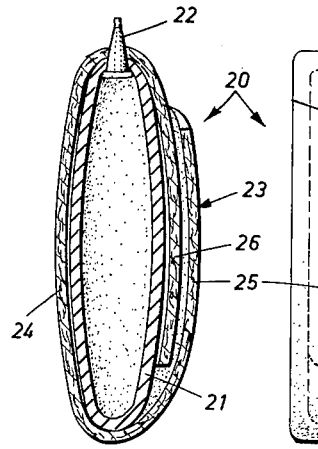
FIGURE 2 is a vertical sectional view along the line 2—2 of FIGURE 3 of one embodiment of a pressure member which can be used with the apparatus of FIGURE 1 and illustrated in copending application Serial No. 646,016.
Figure 3:
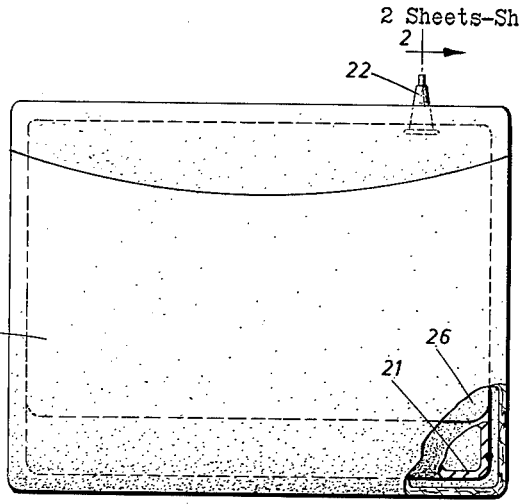
FIGURE 3 is a front elevational view partly broken away of the pressure member illustrated in FIGURE 2.

As illustrated in FIGURES 2 and 3 of the drawings, the inflatable pressure member designated at 20 is identical with the pressure member illustrated in my copending application, Serial No. 646,016. Pressure member 20 comprises a captive broad flat lying inflatable member 21 of vulcanized rubber, preferably butyl rubber which is expansible under inflation and which is provided with a suitable valve device 22.

The inflatable member has a rectangular outline and is enclosed in a pouch formation 23 of like configuration and is formed of substantially non-expansible material as for example, canvas, asbestos or fibreglass cloth. One wall 24 of the pouch formation 23 is continuous while the other wall of the pouch formation is defined by wall 25 terminating part way along the extent of the inflatable member 21 and a flap formation 26 which is adapted to be inserted below the part wall formation 25 to completely encase inflatable member 21.

Under inflation it will be appreciated that wall 24 cannot yield and, therefore, it substantially restricts the inflatable member against ballooning, but, part wall 25 and flap 26 will admit of relative separation therebetween whereby the expansible inflatable member 21 can balloon outwardly thereagainst. Such construction enables pressure member 21 to achieve the desired conformability to an abutting surface because pressure member 20 in the direction taken along 3—3 has an inherent tendency to extend or spread which tendency, when the pressure member is held between two surfaces, has the result of conforming the bag to an abutting surface.

Figure 4:
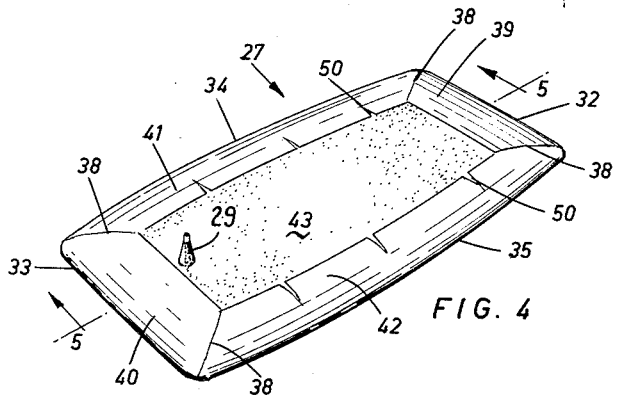
FIGURE 4 is a perspective view of another embodiment of a pressure member according to my invention.
Figure 5:
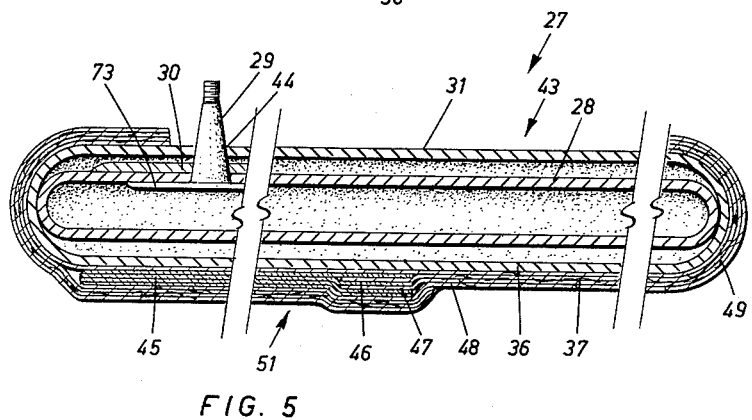
FIGURE 5 is an enlarged vertical mid-sectional view taken along the lines 5—5 of FIGURE 4.

An improved pressure member designated at 27 in FIGURES 4 and 5, utilizing the same principle, disclosed in connection with pressure member 21 in FIGURES 2 and 3, comprises an inner inflatable member 28 of preferably vulcanized butyl rubber which is provided with a valve device 29 secured thereto by vulcanizing and having a section of reinforcing fabric 30 adhered thereover to maintain a positive seal.

The fabric preferably to be used throughout the construction of inflatable member 27 is a high tensile strength, square-woven cotton duck friction fabric which is adhered to the surfaces of the rubber and to each other by means of a suitable, preferably butyl rubber cement.

An outer casing 31 of identical outline as inflatable member 28 is sleeved over member 28 and sealed at its end edges, outer casing 31 being formed of preferably vulcanized butyl rubber.

As best seen in FIGURE 4, the inflatable member 28 and casing 31 are elongated having broad flat upper and lower wall portions joined together at their peripheral edges, the inflatable member having substantially parallel end edges designated at 32 and 33 and are bounded by outwardly curvate longitudinal edges 34 and 35, respectively. Adhered over the lower surface 36 of casing 31 is a fabric layer 37 of preferably square-woven cotton duck friction fabric which extends completely thereover, the layer 37 being slit as at 38 (see FIGURE 4) at each corner so that edge portions 39, 40, 41 and 42 may be conformed around peripheral edges 32, 33, 34 and 35, respectively, to define a peripheral border formation on the opposite surface 43 of casing 31.

Casing 31 also is provided with an aperture 44 to register with valve stem 29, but inflatable member 28 lies within member 31 and is completely separate therefrom.

On fabric layer 37, directly below the valve device 29 (see FIGURE 5) a plurality of layers of heat resistant material designated at 45 are adhered and are preferably of fibreglass sheeting. The fibreglass sheeting 45 is applied at this particular point for the reason that when the pressure member 27 is disposed in a vulcanizing machine it is this particular area that is subjected to intense heat.

The ends 46 of the fibreglass sheeting 45 are layered with ends 47 of fabric sheeting 48 and subsequently, sheets 49 having an extent similar to the sheet 37 are applied over all in the same manner. For truck tires the inflatable pressure member 27 is provided with approximately eight layers of friction fabric but for passenger tires, approximately four layers of friction fabric can be used. In every case, adhesion of the fabric and of the layers of fibreglass is achieved by using unvulcanized butyl rubber cement which is subsequently vulcanized.

The border portions 39 and 41, as seen in FIGURE 4, are preferably slit transversely as at 50 which have the effect under inflation of permitting relative separation of those portions 39 and 41 to permit slight ballooning to achieve a greater spreading.

Inflatable member 27 is adapted to be disposed within the recesses 11 and 12 of side walls 2 and 3, and across the bottom wall 12 of the apparatus of FIGURE 1, to serve as the outside pressure member denoted by 13. The pressure member 27 is disposed in the apparatus as aforesaid to present the layered surface, designated at 51, upwardly with the unrestricted face or area 43 engaging the surfaces of walls 2 and 3 and bottom wall 12 and the valve device 29 is adapted to be registered with the aperture in the wall 2 so that an air hose connection can be made (not shown). The pressure member dimension is such that it substantially completely fills out the recessed walls at the upper end with the ends 32 and 33 engaging against plates 53 and 54, respectively, as seen in FIGURE 1.

Under inflation and in the form of a U-shape the area of the pressure member 27 designated at 43 and to some extent the peripheral edge portions 39 and 41 of the fabric layers are unrestricted against ballooning. Instead of the pressure member tending to reduce its lateral dimension under inflation to take up a somewhat pillow-like configuration, there is a certain spreading or enlarging of the member 27 by virtue of the unrestricted area 43 and the slits 50 of fabric areas 39 and 41. This action brings the curvate edges 34 and 35 in to contact with the end plates 55 and 56 of the walls 2 and 3 and into contact with the inner side of plate 57 of the bottom wall 12.

The pressure member 27, thus limited, under inflation conforms side 51 intimately to the outline of the flexible heater pad 14 and to the outline of a tire casing section 15.

Figures 6, 7:
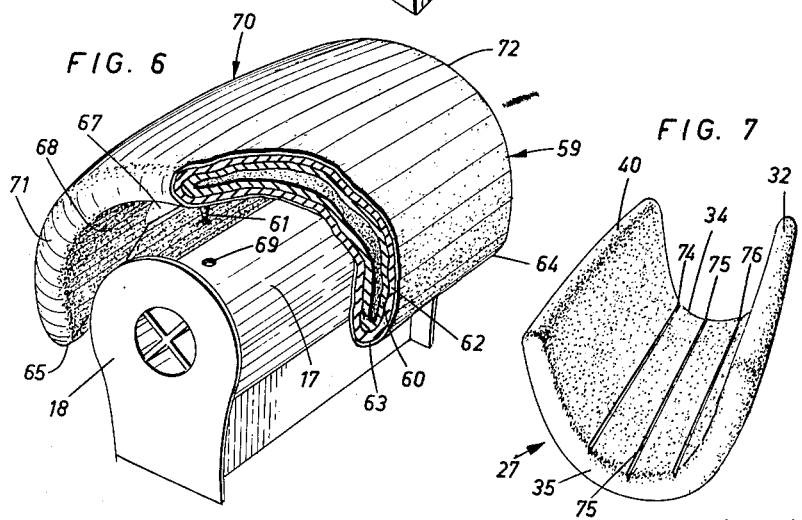

While pressure member 16 to apply pressure to a tire casing wall internally thereof can be of a construction identical to either pressure member 20 as illustrated in FIGURES 2 or 3 or pressure member 27 in FIGURES 4 and 5, an improved inflatable pressure member 29 for such use is illustrated in FIGURE 7.

In construction, member 59 is similar to member 27 having an inner expansible vulcanized member 60, a valve device 61 and an outer sheath of vulcanized rubber 62. The fabric of member 59, however, is in the form of overlapped broad strips 63 arranged in parallel relation transversely of the broad flat-lying members 60 and 62 throughout their extent but at the ends 64 and 65, fabric pieces 66 are adhered to control ballooning. On the opposite face 67 the fabric strips 63 and end pieces 66 define a peripheral border 68 leaving the central area unrestricted.

This arrangement gives directional control to the ballooning of the pressure member 59 transversely thereof to prevent blowout but leaves the longitudinal direction somewhat unrestricted for ballooning. It will be appreciated that this tendency will enhance the conformability characteristics of layered surface 70 of the pressure member 59 when the pressure member 59 is applied to the tubular core 17 and placed within a tire casing section 15 to be expanded into engagement with the concave inner tire casing wall.

As in the case with pressure member 27 the longitudinal curvate edges 71 and 72 of pressure member 59, under inflation and conformed about tubular core 17, are urged into contact with end plates 18 which limitation assists in causing the layered surface 70 to conform into intimate contact with the heater 19 and inner tire casing wall. Also, aperture 69 is provided in core 17 to register with valve device 61.

*Method of Manufacture*

The method of manufacture of the pressure members will be illustrated with reference to pressure member 27 shown in FIGURES 4 and 5 of the drawings.

The inner inflatable member 28 is formed first, by severing a requisite length of uncured butyl rubber tube from a straight piece, such as that used in the manufacture of tire tubes, and piercing the length for the reception of a valve device indicated at 29. The length of butyl rubber tube is then fitted with an inflatable member which is inflated to distend the uncured and stretchable piece to form curvate or elliptical longitudinal edges which are designated at 34 and 35 in FIGURE 4.

The ends of such butyl tubular piece are then scraped clean and cemented with preferably unvulcanized butyl cement and sealed together, after which the sealed ends are submitted to a bar seal under forty pounds pressure and at approximately 200° F.

Several inches at each end of the member 28 are cleaned with a suitable fluid and the area provided with a layer of butyl cement whereupon the ends are lapped upon themselves. After applying pressure to the lapped ends to remove any air bubbles, that might be caught in the folding over operation, valve member 29 is then inserted in the pierced aperture member 28 and the base 73 of valve device 29 adhered to the inner surface of member 28 by means of adhesive and a section of the friction fabric 30 applied thereover.

Inflatable member 28 is then cured for approximately one hour in a suitable kettle under 40 p.s.i. which has a temperature of approximately 260° to 300° and at an average temperature of 285° F.

The casing 31 of pressure member 28 is in a similar manner cut from a straight length of uncured butyl tube and then stretched by the inflatable device to give its longitudinal edges the outwardly curvate configuration. Then such butyl rubber tube is sleeved over the vulcanized inflatable member 28.

The ends of the uncured member 31 are sealed upon themselves by lapping the ends over and using butyl cement. At this stage fabric layer 37 is adhered over surface 36 of member 31 with the portion 39, 40, 41 and 42 lapped over the bounding edges to define the peripheral border formation on surface 43.

The layers of fibreglass 45 and layers of fabric 48 and 49 are then applied to the casing.

A mould for curing the outer member or casing 31 is provided and has a U-shaped configuration, the mould having a set of transverse rods, approximately three in number, which are adapted to engage the surface 51 centrally and form transverse grooves 74, 75 and 76 as indicated in FIGURE 7. By providing the transverse rods, excess material which occurs when such planar member is disposed in U shape is taken up so that the finished surface 51 of member 27 to be presented to the convex tire casing wall will be free of wrinkles.

Prior to the final vulcanization step of member 31 and of the butyl rubber adhesive, member 31 is vented by cutting a hole therethrough. With the composite pressure member disposed within the U-shaped mould, pressure is then applied to the internal vulcanized inflatable member 28 to give a moulding pressure of approximately 12 pounds. This applied pressure urges outer member 31 into conformity with the U-shaped mould and the afore-mentioned transverse rods to define the recesses 74, 75 and 76. The outer member 31 and the butyl rubber adhesive is then vulcanized by preferably providing steam pressure at approximately 40 p.s.i.

In the alternative, where a planar bag is required, a vulcanizing step may be undertaken with the member lying flat.

By virtue of the flexibility achieved by pressure members constructed in accordance with the invention it is possible to fit tires over a range of sizes thus obviating the necessity of providing one pressure member for each tire size, as has been required in section vulcanizing. Also, because of the flexible nature of the pressure member the degree of conformability exceeds that of any other type. It has also been found that with this type of inflatable pressure member and indeed, by selecting butyl rubber tubing and adhesive, it has been possible to provide a pressure member which will withstand two to three thousand cures as compared to two hundred maximum cures for any other type of section bag. Moreover, the simple method of construction permits production and sale for a much lower figure.

While the preferred embodiments of the invention have been illustrated in the drawings and described in the specification it will be appreciated that modifications and variations may be undertaken without departing from the spirit and scope of the invention as defined in the appended claims.

What I claim is:

1. An inflatable pressure member comprising a broad flat lying inflatable member in its uninflated state defined by overlying sheet-like coextensive walls of expansible material united at and bounded by generally longitudinally extending side edges and transversely extending end edges, and a casing applied over said inflatable member including a flexible substantially non-extensible wall portion overlying one of said sheet-like wall portions of said inflatable member, an integral flexible substantially non-extensible edge portion extending over the bounding side edges and end edges of said inflatable member and an integral flexible non-extensible border portion having an extent inwardly to overlie the area bordering the longitudinal and side edges of the other of said sheet-like wall portions of said inflatable member and leaving a central area having both a substantial longitudinal and transverse extent substantially unrestricted against expansion under inflation whereby said pressure member under inflation is constrained against expansion in the region of one wall, the bounding edges of, and the area bordering the longitudinal and side edges of the other wall of the inflatable member and free to extend both longitudinally and transversely in the region centrally of said latter mentioned wall of the inflatable member.

2. An inflatable pressure member according to claim 1 in which said outer casing comprises a sheath member defined by overlying sheet-like coextensive walls of expansible material united at and bounded by longitudinal side edges and transverse end edges and having a configuration to snugly enclose said inflatable member in its flat-lying uninflated state, and flexible substantially non-extensible means integral with the expansible material of said sheath and extending over one wall thereof, the bounding longitudinal and side edges thereof and inwardly over the border area of the other wall of said sheath and leaving a central area having both a substantial longitudinal and transverse extent unrestricted.

3. An inflatable pressure member according to claim 2 in which said flexible substantially non-extensible means comprises a substantially non-extensible fabric sheet having an extent and configuration to overlie the aforesaid wall of said sheath, the bounding edges thereof and the border area of the other wall of said sheath, said fabric sheet being adhered against separation to the expansible material of said sheath, and having a plurality of slits extending from the inner edges of same outwardly, in that portion overlying the border area of the said other sheath wall, whereby under inflation of said inner inflatable member slight relative separation of the expansible material of the sheath wall constrained by the border portion is achieved.

4. An inflatable pressure member according to claim 2 in which said substantially non-extensible means comprises of a plurality of non-extensible fabric strips arranged to extend transversely of said sheath in substantially parallel side by side relation, throughout the longitudinal extent of said sheath member, each strip extending from points inwardly of the longitudinal edges of said other sheath wall over the area bordering same, around the longitudinal edges of the sheath member and over the first-mentioned wall of the sheath member, and being adhered against separation thereto, there being provided additional fabric pieces, adhered over the transverse end edges of said sheath constraining same under inflation against expansion.

5. The combination with tire repair apparatus or the like in which a rigid surface is provided having a substantial transverse and longitudinal extent and having a generally U-shaped configuration longitudinally with walls upstanding from the longitudinal edges thereof, of a broad flat-lying pressure member registering flatwise in its uninflated state within the aforesaid upstanding longitudinal walls and with one surface abutting against said aforementioned rigid surface, said pressure member comprising an inflatable member defined by overlying sheet-like coextensive walls of expansible material united at and bounded by generally longitudinally extending side edges and transversely extending end edges, and a casing applied over said inflatable member including a flexible substantially non-extensible wall portion overlying one of said sheet-like wall portions of said inflatable member, an integral flexible substantially non-extensible edge portion extending over the bounding side edges and end edges of said inflatable member and an integral flexible non-extensible border portion having an extent inwardly to overlie the area bordering the longitudinal and side edges of the other of said sheet-like wall portions of said inflatable member and having a central area having both a substantial longitudinal and transverse extent substantially unrestricted whereby said pressure member under inflation is constrained against expansion in the region of one wall, the bounding edges of, and the area bordering the longitudinal side edges of the other wall of the inflatable member and free to extend both longitudinally and transversely in the region centrally of said latter mentioned wall of the inflatable member and further characterized in that the surface of said pressure member abutting against said rigid surface of said tire repair apparatus is that wall of said pressure member which is unrestricted in the central region thereof under inflation of same.

6. An inflatable pressure member according to claim 2 in which said inner inflatable member and outer sheath member are bounded by substantially parallel end edges and outwardly curvate longitudinal edges.

7. An inflatable pressure member according to claim 3 in which a plurality of superimposed substantially non-extensible fabric sheets are adhered against separation over said sheath member and bounding edges.

8. A device according to claim 7 in which a plurality of insulating sheets are interleaved with said flexible non-extensible fabric sheets.

References Cited in the file of this patent

UNITED STATES PATENTS

| | | |
|---|---|---|
| 1,084,895 | Newson | Jan. 20, 1914 |
| 1,149,008 | Webster | Aug. 3, 1915 |
| 1,337,707 | Alsten | Apr. 20, 1920 |
| 1,412,799 | Burdette | Apr. 11, 1922 |
| 1,553,982 | Carter | Sept. 15, 1925 |
| 1,625,383 | Wheelock | Apr. 19, 1927 |
| 1,799,933 | Synder | Apr. 7, 1931 |
| 2,308,268 | Carson | Jan. 12, 1943 |
| 2,442,499 | Kraft | Jan. 1, 1948 |
| 2,814,073 | Van Scoyk | Nov. 26, 1957 |